United States Patent [19]

Wuestefeld et al.

[11] Patent Number: 5,667,848

[45] Date of Patent: Sep. 16, 1997

[54] USE OF AQUEOUS POLYMER DISPERSIONS AS TEXTILE AUXILIARIES FOR EASY-CARE FINISHING OF TEXTILES

[75] Inventors: Renate Wuestefeld, Schifferstadt; Toni Simenc, Mannheim, both of Germany

[73] Assignee: BASF Aktiengesellschaft, Ludwigshaften, Germany

[21] Appl. No.: 397,250

[22] PCT Filed: Sep. 25, 1993

[86] PCT No.: PCT/EP93/02614

§ 371 Date: Mar. 22, 1995

§ 102(e) Date: Mar. 22, 1995

[87] PCT Pub. No.: WO94/08085

PCT Pub. Date: Apr. 14, 1994

[30] Foreign Application Priority Data

Oct. 6, 1992 [DE] Germany .......... 42 33 497.7

[51] Int. Cl.$^6$ ........................... B05D 3/02
[52] U.S. Cl. .............. 427/389.9; 427/392; 427/393.2; 524/457; 524/734; 524/732; 524/56; 526/200
[58] Field of Search ................ 524/457, 734, 524/732, 56; 526/200; 427/389.9, 392, 393.2

[56] References Cited

U.S. PATENT DOCUMENTS

| | | | |
|---|---|---|---|
| 3,536,650 | 10/1970 | Jasinski et al. | 260/29.6 |
| 3,910,759 | 10/1975 | Sthare et al. | 524/457 X |
| 3,954,724 | 5/1976 | Nakashio et al. | 526/200 |
| 4,532,295 | 7/1985 | Brabetz et al. | 524/827 |
| 4,560,724 | 12/1985 | Brabetz et al. | 524/734 |
| 4,835,212 | 5/1989 | Degen et al. | 524/734 |
| 4,855,343 | 8/1989 | Degen et al. | 524/47 |
| 5,004,767 | 4/1991 | Krause et al. | 524/30 |
| 5,145,906 | 9/1992 | Chambers et al. | 524/732 |
| 5,147,907 | 9/1992 | Rinck et al. | 524/48 |

FOREIGN PATENT DOCUMENTS

| | | | |
|---|---|---|---|
| 0695876 | 10/1964 | Canada | 524/734 |
| 0 334 515 | 3/1989 | European Pat. Off. | |
| 0 345 566 | 5/1989 | European Pat. Off. | |
| 1 110 606 | 3/1959 | Germany . | |
| 1 209 989 | 11/1962 | Germany . | |
| 3323804 | 1/1985 | Germany | 524/734 |

*Primary Examiner*—Judy M. Reddick
*Attorney, Agent, or Firm*—Oblon, Spivak, McClelland, Maier & Neustadt, P.C.

[57] ABSTRACT

Aqueous polymer dispersions obtainable by polymerizing free-radically polymerizable unsaturated monomers in aqueous phase in the presence of a saccharide or of mixtures of saccharides by the method of free-radical aqueous emulsion polymerization are useful textile auxiliaries for the easy-care finishing of textile fabrics.

7 Claims, No Drawings

USE OF AQUEOUS POLYMER DISPERSIONS AS TEXTILE AUXILIARIES FOR EASY-CARE FINISHING OF TEXTILES

The present invention relates to the use of aqueous polymer dispersions obtainable by polymerizing free-radically polymerizable unsaturated monomers in aqueous phase in the presence of a saccharide or of a mixture of saccharides by the method of free-radical aqueous emulsion polymerization as textile auxiliaries for the easy-care finishing of textiles. It further relates to a method for the easy-care finishing of textiles and to textile auxiliary formulations comprising the aqueous polymer dispersions mentioned.

Aqueous dispersions of film-forming polymers are known for use as auxiliaries in the easy-care resin finishing of textiles. In addition to the units responsible for the film-forming properties, which are usually acrylate based, they additionally contain copolymerized monomer units with groups capable of reacting with reactive resin finishes (crosslinkers) in the presence of catalysts. The reactive monomer units used are usually N-methylol compounds of acrylamide and methacrylamide and esters of unsaturated organic acids such as acrylic acid or methacrylic acid.

For instance, DE-B-1 209 989 (1) describes dispersions of copolymers of an N-methylolamide of an acrylic acid, a component having at least two polymerizable double bonds in the molecule and further polymerizable compounds for use as textile auxiliaries.

DE-B-1 110 606 (2) likewise discloses that a copolymer of an N-methylolamide of an acrylic acid and other polymerizable compounds can be used for the resin finishing of cellulose fabrics.

These commercial film-forming polymers are usually added as auxiliary additives to aqueous finishing liquors in order to obtain the desired easy-care properties on the finished textile fabric. The effect is to improve a wide range of properties.

EP-A-345 566 (3) concerns formaldehyde-free crosslinking agents based on a copolymer of hydroxyl-free monomers and hydroxyl-containing components such as polyvinyl alcohol, starch, starch derivatives or colloidal cellulose. These crosslinking agents are used to produce nonwoven fibrous structures incorporating at least 10% by weight of this agent.

The disadvantage of the known polymer dispersions as described for example in (1) or (2), however, is their poor shear stability on the squeeze (pad-mangle) rolls. The high shearing forces of pad-mangle rolls, in particular at higher production speeds and in the case of dense textile material, cause the dispersions to break, precipitating the film-forming polymer from the dispersion. The rolls become covered with a film which can cause difficult-to-remove stains on the textile material.

Moreover, the known film-forming polymer dispersions used in easy-care finishing are anionic, which severely limits their use alongside other auxiliaries in the impregnating bath. They are incompatible with all cationic auxiliaries.

It is an object of the present invention to provide novel polymer dispersions for the stated use which are free of the disadvantages of the prior art agents.

We have found that this object is achieved by the aqueous polymer dispersions defined at the beginning.

Saccharides as the term is used herein are monosaccharides, oligosaccharides, polysaccharides, oxidatively, hydrolytically and/or enzymatically degraded polysaccharides and chemically modified mono-, oligo- and polysaccharides.

Suitable free-radically polymerizable monomers include inter alia in particular monoethylenically unsaturated monomers such as olefins, for example ethylene, aromatic vinyl monomers such as styrene, $\alpha$-methylstyrene, o-chlorostyrene or vinyltoluenes, vinyl halides and vinylidene halides such as vinyl chloride and vinylidene chloride, esters of vinyl alcohol with mono-carboxylic acids having from 1 to 18 carbon atoms such as vinyl acetate, vinyl propioniate, vinyl n-butyrate, vinyl laurate and vinyl stearate, esters of $\alpha,\beta$-monoethylenically unsaturated mono- and dicarboxylic acids of preferably from 3 to 6 carbon atoms such as in particular acrylic acid, methacrylic acid, maleic acid, fumaric acid and itaconic acid with alkanols having in general from 1 to 12, preferably from 1 to 8, in particular from 1 to 4, carbon atoms such as in particular methyl, ethyl, n-butyl, isobutyl and 2-ethylhexyl acrylates and methacrylates, dimethyl maleate or n-butyl maleate, nitriles of $\alpha,\beta$-monoethylenically unsaturated carboxylic acids such as acrylonitrile, and also $C_{4-8}$ conjugated dienes such as 1,3-butadiene and isoprene. If nitriles are used, their share of the total amount of monomers used should be less than 20% by weight, in particular less than 10% by weight. The monomers mentioned are essentially insoluble in an aqueous medium and in general comprise the principal monomers, which, based on the total amount of monomers to be polymerized, normally account for a share of more than 50% by weight. Monomers which, polymerized by themselves, customarily produce homopolymers of enhanced water solubility, are normally merely copolymerized as modifying monomers in amounts, based on the total amount of monomers to be polymerized, of less than 50% by weight, in general from 0.5 to 20, preferably from 1 to 10,% by weight.

Examples of such monomers are $\alpha,\beta$-monoethylenically unsaturated mono- and dicarboxylic acids of from 3 to 6 carbon atoms and amides thereof, viz. acrylic acid, methacrylic acid, maleic acid, fumaric acid, itaconic acid, acrylamide and methacrylamide, also vinylsulfonic acid and water-soluble salts thereof, vinylphosphonic acid, its water-soluble salts and esters and also N-vinylpyrrolidone, 2-hydroxyethyl acrylate, 3-hydroxypropyl acrylate and dimethylaminoethyl acrylate. Monomers which customarily increase the cohesion of the films formed from the aqueous polymer dispersion are in general likewise present as copolymerized units only in minor amounts, usually from 0.5 to 10% by weight, based on the total amount of the monomers to be polymerized. Normally, such monomers have an epoxy, hydroxyl, N-methylol or carbonyl group or at least two nonconjugated ethylenically unsaturated double bonds. Examples are N-alkylolamides of $\alpha,\beta$-monoethylenically unsaturated carboxylic acids of from 3 to 10 carbon atoms and esters thereof with alcohols of from 1 to 4 carbon atoms, of which N-methylolacrylamide and N-methylolmethacrylamide are very particularly preferred. Preference is also given to N-methylol and N-methylol ether compounds of urea, melamine, glyoxal monourein and acetylene diurea. It is also possible to use the reaction products of glyoxal and dialkylureas, in particular dimethylurea. Further examples of crosslinking monomers are divinyl monomers, divinylidene monomers and dialkylene monomers. Of particular suitability are the diesters of dihydric alcohols with $\alpha,\beta$-monoethylenically unsaturated monocarboxylic acids, of which in turn acrylic acid and methacrylic acid are preferred. Examples of such monomers having two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate or methylenebisacrylamide. In addition to monomers with unsaturated double bonds, minor amounts, customarily from 0.01 to 4% by weight, based on the monomers to be polymerized, of molecular weight regulators such as tert-dodecyl mercaptan can be polymerized in as well. Preference is given to introducing such substances into the polymerization zone mixed with the monomers to be polymerized.

Preferred classes of aqueous polymer dispersions to be used according to the invention are those whose polymers are obtainable by free-radical polymerization of monomer mixtures which are composed to an extent of from 50 to 100% by weight of esters of acrylic and/or methacrylic acid with alkanols of from 1 to 12, in particular from 1 to 4, carbon atoms (class I) or to an extent of from 70 to 100% by weight of styrene and/or vinyl acetate and/or vinyl propionate (class II), of which class I is particularly preferred and preferably comprises the following monomer compositions:

| from 90 to 99% by weight | of esters of acrylic and/or methacrylic acid with alkanols of from 1 to 8 carbon atoms, and |
| --- | --- |
| from 1 to 10% by weight | of acrylic acid, methacrylic acid or a mixture thereof. |
| Of very particular interest are the following monomer compositions: | |
| from 90 to 99% by weight | of n-butyl acrylate |
| from 1 to 10% by weight | of acrylic acid and/or methacrylic acid. |

The polymerization of the monomers mentioned is effected according to the invention by the method of free-radical aqueous emulsion polymerization in the presence of polysaccharides, oligosaccharides, monosaccharides and/or derivatives thereof. They can be of vegetable or animal origin, soluble or only dispersible in water. Preference is given to oligo- or polysaccharides, or oxidatively, hydrolyrically and/or enzymatically degraded polysaccharides, chemically modified mono-, oligo- or polysaccharides or mixtures of the compounds mentioned having a molecular weight of up to 25,000, the molecular weight in question being a weight average molecular weight $M_w$.

Of particular suitability are inter alia the swellable starches, which are obtainable for example by hydrothermal treatment of native starch. It is also possible to use thin-boiling starches. These are starches which have been mildly degraded with acids or enzymes or oxidized with mild oxidizing agents and which on boiling in water, even in relatively high concentrations, do not form a viscous gel but relatively thin liquids. It is also possible to use acid-modified starches which are obtained by heating an aqueous starch suspension at below the gelatinization temperature in the presence of small amounts of an acid. Oxidatively modified starches are suitable too. The oxidizing agents used can be for example chromic acid, permanganate, hydrogen peroxide, nitrogen dioxide, hypochlorite or periodic acid. Suitable starting starches are in principle all native starches such as cereal starches (eg. corn, wheat, rice or millet), tuber or root starches (eg. potatoes, tapioca roots or arrowroot) or sago starches. Of particular advantage is the use of roast dextrins as described for example in EP-A-408 099 and EP-A-334 515. They are obtainable by heating moist starch, usually in the presence of small amounts of an acid. Typical roast dextrins are for example commercially available white and yellow dextrins; also included are dextrins marketed under the trademarks Noredux® and Tackidex®. Herein the termdextrin is used as generic for starch degradation products. However, it is of very particular advantage to carry out the free—radical emulsion polymerization in the presence of saccharified starches. A saccharified starch is a starch degradation product which is obtainable by hydrolysis in aqueous phase and preferably has a weight average molecular weight $M_w$ of from 1000 to 25000. Further details concerning the preparation of the starches and starch derivatives mentioned may be found in G. Tegge, Stärke und Stärkederivate, Behr's Verlag, Hamburg 1984. Of course, the starches and starch derivatives mentioned can for example be used for the purposes of the invention following chemical modification by etherification or esterification.

This chemical modification can be effected even before the original starch has been degraded, or afterwards. Esterifications are possible not only with inorganic but also with organic acids, their anhydrides or chlorides. Of particular interest are phosphated and acetylated derivatives. The most common method of etherification is treatment with organic halogen compounds, epoxides or sulfates in an aqueous alkaline solution. Particular suitable ethers are alkyl ethers, hydroxyalkyl ethers, carboxyalkyl ethers and allyl ethers. It is also possible to use cyanoalkylated derivatives and reaction products with 2,3-epoxypropyltrimethylammonium chloride. Chemically unmodified products are preferred. It is of course also possible to use mono- and oligosaccharides and degradation products of cellulose, for example cellobiose and oligomers thereof. Also suitable are alkyl-mono-, -di- and -polyglucosides.

The saccharified starches with a weight average molecular weight of from 1000 to 25000 which are very particularly preferred for use according to the invention are commercially available as such (eg. the C* PUR products 01906, 01908, 01910, 01912, 01915, 01921, 01924, 01932 or 01934 from Cerestar Deutschland GmbH, D-4150 Krefeld 12). These kinds of saccharified starches are chemically different from the roast dextrins, inter alia because in a hydrolytic degradation in an aqueous medium (usually a suspension or solution), which in general is carried out at solids contents of from 10 to 30% by weight and preferably acid- or enzyme-catalyzed, there is essentially no possibility of recombination and branching taking place, so that inter alia the molecular weight distribution will be different. Thus, saccharified starches with a bimodal molecular weight distribution have proved particularly advantageous for the purposes of the invention. The preparation of saccharified starches is generally known; see inter alia G. Tegge, St ärke und Stärkederivate, Behr's Verlag, Hamburg 1984, page 173 and pages 220 ff and EP-A-441 197. The saccharified starches to be used according to the invention preferably are those with their weight average molecular weight $M_w$ within the range from 1000 to 16000.

The saccharified starches to be used according to the invention are normally completely soluble in water at room temperature, the solubility limit being in general above 50% by weight, which proves to be particularly advantageous for preparing the aqueous polymer dispersions of the invention.

It has also proved to be advantageous for the saccharified starches to be used according to the invention to have a polydispersity index U (defined as the ratio of the weight average molecular weight $M_w$ to the number average molecular weight $M_n$; U characterizes the molecular weight distribution) within the range from 6 to 12.

It is also of advantage for the weight proportion of the saccharified starches to be used according to the invention that has a molecular weight below 1000 to be at least 10% by weight, but not more than 70% by weight.

Furthermore, it is advisable to use those saccharified starches of the invention whose dextrose equivalent DE is from 5 to 40. The DE value characterizes the reducing power relative to the reducing power of anhydrous dextrose and is determined in accordance with DIN 10308 Edition 5.71 of the Special Committee for Foodstuffs and Agricultural Products (cf. also Günther Tegge, Stärke und Starkederivate, Behr's Verlag, Hamburg 1984, p. 305).

It has also been found that aqueous polymer dispersions which have a particularly favorable property profile are obtained on using according to the invention saccharified starches whose 40% strength by weight aqueous solutions at 25° C. and a shear gradient of 75 s$^{-1}$ have under DIN 53 019 a dynamic viscosity $\pi^{40}$ [Pa.s] of from 0.005 to 0.06, preferably from 0.007 to 0.04.

It may be mentioned in this connection that, unless otherwise mentioned, statements herein about the molecular weight of saccharides and saccharide derivatives to be used according to the invention are based on determinations by means of gel permeation chromatography under the following conditions:

| | |
|---|---|
| Columns: | 3 off 7.5 × 600 mm steel filled with TSK gel G 2000 PW, G 3000 PW and G 4000 PW; pore size 5 µm |
| Eluent: | distilled water |
| Temperature: | RT (room temperature) |
| Detection: | differential refractometer (eg. ERC 7511) |
| Flow rate: | 0.8 ml/min pump: eg. ERC 64.00 |
| Injection volume: | 20 µl valve: eg. VICI 6-wave valve |
| Evaluation: | Bruker Chromstar GPC Software |
| Calibration: | At the low molecular weight end with glucose, raffinose, maltose and maltopentose; at the higher molecular weight end with pullulan standards having a polydispersity < 1.2. |

The mono-, oligo- and polysaccharides and/or derivatives thereof present according to the invention during the free-radical aqueous emulsion polymerization can be present not only as single dispersants but also as mixtures with other surfactants. If used as single dispersants, they are normally present in the aqueous polymer dispersions of the invention in amounts of, based on the amount of monomers to be polymerized, from 1 to 50% by weight. The aqueous emulsion polymerization is preferably carried out with a ratio of 100 parts by weight of unsaturated monomer to from 5 to 40, in particular from 10 to 30, parts by weight of the saccharide component.

Suitable co-surfactants for inclusion in the dispersant component are basically the protective colloids and emulsifiers otherwise customarily used as dispersants. A detailed description of suitable protective colloids may be found in Houben-Weyl, Methoden der organischen Chemie, Volume XIV/1, Makromolekulare Stoffe, Georg-Thieme-Verlag, Stuttgart, 1961, pages 411 to 420. Suitable co-emulsifiers may be anionic, cationic or nonionic. Preferably the co-surfactants used are all emulsifiers whose molecular weights are customarily below 2000, in contradistinction to protective colloids. Of course, if mixtures of surfactants are used the individual components need to be compatible with one another, which in doubt can be verified by means of a few preliminary experiments. Preferably, the co-surfactants used are anionic or nonionic emulsifiers. Examples of customary co-emulsifiers are ethoxylated fatty alcohols (degree of ethoxylation: 3–50, alkyl radical: $C_8$–$C_{18}$), ethoxylated mono-, di- and trialkylphenols (degree of ethoxylation: 3–50, alkyl radical: $C_4$–$C_9$), alkali metal salts of dialkyl esters of sulfosuccinic acid and also alkali metal and ammonium salts of alkyl sulfates (alkyl radical: $C_8$–$C_{12}$), of ethoxylated alkanols (degree of ethoxylation: 4–30, alkyl radical: $C_{12}$–$C_{18}$), of ethoxylated alkylphenols (degree of ethoxylation: 3–50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable emulsifiers are given in Houben-Weyl, Methoden der organischen Chemie, Volume XIV/1, Makromolekulare Stoffe, Georg Thieme Verlag, Stuttgart, 1961, pages 192 to 208. Preference is given to those surfactants which are biodegradable and which as well as their degradation and secondary products are toxicologically safe. Co-surfactants are in general employed in amounts of up to 5% by weight, in particular from 0.1 to 1% by weight, based on the amount of monomers to be polymerized.

The emulsion polymerization temperature is in general from 30° to 95° C., preferably from 75° to 90° C. The polymerization medium can consist not only of water but also of mixtures of water and water-miscible liquids such as methanol. Preferably, only water is used. The emulsion polymerization can be carried out not only as batch process but also in the form of a feed stream addition process, both stepwise or gradient. Preference is given to the feed stream addition process in which part of the polymerization batch is introduced as initial charge, heated to the polymerization temperature and polymerized incipiently and then the remainder of the polymerization batch is added to the ongoing polymerization continuously, stepwise or with superposition of a concentration gradient, usually via a plurality of spatially separate feed streams, of which one or more contain the monomers in pure or in emulsified form. From an application point of view it is advantageous for the initial charge and/or the monomer feed stream to contain small amounts of emulsifiers, in general less than 0.5% by weight based on the total amount of the monomers to be polymerized, in order to reduce the surface tension of the dispersing medium and so to facilitate the stirring in of the feed streams. Frequently the monomers are therefore fed into the polymerization zone pre-emulsified with these auxiliary emulsifiers. Advantageously, the total amount of the mono-, oligo- and polysaccharide and/or derivatives thereof is present in an initial aqueous charge.

Suitable free-radical polymerization initiators include all those capable of initiating a free-radical aqueous emulsion polymerization. This includes not only peroxides, for example alkali metal or ammonium peroxodisulfates or $H_2O_2$, but also azo compounds.

It is also possible to use combined systems composed of at least one organic reducing agent and at least one peroxide and/or hydroperoxide, eg. tert-butyl hydroperoxide with the sodium salt of hydroxymethanesulfinic acid or hydrogen peroxide with ascorbic acid. It is also possible to use combined systems which in addition contain a small amount of a metal compound that is soluble in the polymerization medium and whose metallic component can exist in a plurality of valence states, eg. ascorbic acid/iron(II) sulfate/hydrogen peroxide, although the ascorbic acid is frequently also replaced by the sodium salt of hydroxymethanesulfinic acid, sodium sulfite, sodium hydrogen sulfite or sodium metabisulfite and the hydrogen peroxide by tert-butyl hydroperoxide or alkali metal peroxodisulfates and/or ammonium peroxodisulfates. With the combined systems it is further advantageous to use the saccharified starches as reducing component. In general, the amount of free-radical initiator system used is from 0.1 to 2% by weight, based on the total amount of monomers to be polymerized. Particular preference is given to using ammonium and/or alkali metal peroxodisulfates by themselves or as part of combined systems as initiators.

The manner in which the free-radical initiator system is added to the polymerization vessel in the course of the free-radical aqueous emulsion polymerization of the invention is of rather subsidiary importance. The initiator system can not only be introduced in full into the polymerization vessel as initial charge but also be added continuously or stepwise in the course of the free-radical aqueous emulsion polymerization at the rate of its consumption. Which method is chosen in a specific case depends, in the manner known to the person of ordinary skill in the art, not only on the chemical nature of the initiator system but also on the polymerization temperature. Preferably, part is introduced as initial charge and the remainder is added to the polymerization zone at the rate of consumption.

Of course, the free-radical aqueous emulsion polymerization of the invention can also be carried out under superatmospheric or reduced pressure.

The aqueous polymer dispersions used according to the invention are in general prepared with total solids contents of from 15 to 70% by weight, particularly preferred application properties being shown by those which contain from 1 to 50, particularly preferably from 10 to 40, especially from 10 to 30,% by weight, based on the monomers to be polymerized, of the mono-, oligo- or polysaccharides and/or derivatives thereof to be used according to the invention.

Very particularly useful textile auxiliaries for the easy-care finishing of textiles are aqueous polymer dispersions whose polymers are obtainable by free-radical polymerization of monomer mixtures which have the following monomer composition:

| | |
|---|---|
| from 39 to 90% by weight | of at least one ester of an α,β-monoethylenically unsaturated mono- or dicarboxylic acid of from 3 to 6 carbon atoms with an alkanol of from 1 to 6 carbon atoms (monomer a), |
| from 1 to 10% by weight | of at least one monomer from the group consisting of α,β-monoethylenically unsaturated carboxylic acids of from 3 to 6 carbon atoms, their amides and nitriles (monomer b), and |
| from 0 to 10% by weight | of one or more monomers from the group consisting of N-alkylolamides of α,β-monoethylenically unsaturated carboxylic acids of from 3 to 6 carbon atoms having from 1 to 4 carbon atoms in the alkyl group and monomers of up to 25 carbon atoms containing 2 unconjugated ethylenically unsaturated double bonds (monomer c), | and which, based on the monomers to be polymerized, contain from 1 to 50, preferably from 5 to 40, in particular from 10 to 30,% by weight of mono-, oligo- or polysaccharides and/or derivatives thereof. Of course, the monomers may also be wholly or partly replaced by other crosslinking monomers mentioned herein.

Of particular advantage are aqueous polymer dispersions obtainable by free-radical aqueous emulsion polymerization of mixtures of monomers a, b and c whose monomer composition has been selected in such a way that a polymer composed only of monomers a and b would have a glass transition temperature within the range from −70° to +40° C.

The glass transition temperature is measurable in a conventional manner as the midpoint temperature defined in ASTM 3418/82. A calculation of the glass transition temperature is possible from the weight proportions of the ethylenically unsaturated monomers involved in making up a polymer by the Fox relationship. According to Fox (T. G. Fox, Bull. Am. Phys. Soc. (Set. II) 1 (1956), 123), the glass transition temperature of copolymers is given to a good approximation by:

$$\frac{1}{Tg} = \frac{X^1}{Tg^1} + \frac{X^2}{Tg^2} + \ldots \frac{X^s}{Tg^s}$$

where $X^1, X^2, \ldots, X^s$ are the mass fractions of the monomers $1, 2, \ldots, s$ and $Tg^1, Tg^2, \ldots, Tg^s$ are the glass transition temperatures in kelvin of the polymers composed of only one of the monomers $1, 2, \ldots, s$. The glass transition temperatures of the monomers a, b and c are essentially known; see for example J. Brandrup, E. H. Immergut, Polymer Handbook 1st Ed. J. Wiley, New York 1966 and 2nd Ed. J. Wiley, New York 1975.

The polymer dispersions to be used according to the invention can in principle be used to treat any customary textile material.

The present invention also provides a method for the easy-care finishing of textiles by impregnating the textile material, usually at from 10° to 35° C., with an aqueous bath containing at least one of the aqueous polymer dispersions described and subsequently drying the impregnated textile material at from 80° to 200° C., preferably at from 100° to 160° C.

The polymer dispersions described are particularly useful as textile auxiliaries for the easy-care and crease-resist finishing of cellulose-containing textile materials, in particular of cotton or cotton-containing fabrics, eg. cotton-polyester. In this case the aqueous impregnating bath to be used generally, in addition to the polymer dispersions, contains a reactive low molecular weight crosslinker with N-alkyl, N-methylol and/or N-methylol ether groups and a crosslinking catalyst. The impregnated textile material is then dried and cured at from 80° to 200° C.

The most common crosslinkers for easy-care and crease-resist finishing are compounds with N-methylol or N-methylol ether groups. They are reaction products of formaldehyde and preferably urea, glyoxal monourein, melamine and acetylenediurea. On the finished material these crosslinkers release small amounts of free formaldehyde.

Of particular promise is therefore the use of the polymer dispersions described with formaldehyde-free crosslinkers prepared from dialkylureas and glyoxal, preferably from dimethylurea and glyoxal (dimethyldihydroxyethyleneurea). Since a formaldehyde-free crosslinker is only slightly inferior in effectiveness to a formaldehyde-containing crosslinker, the use of the polymer dispersions described is distinctly beneficial for the easy-care properties of the finished material.

The crosslinking catalysts are preferably latently acidic salts, frequently blended with small amounts of organic acids such as citric, adipic, glycolic or tartaric acid. The salts are in particular magnesium, zinc, sodium and ammonium salts of inorganic acids such as hydrochloric, nitric, hydrofluoric, phosphoric and sulfuric acid. The sodium salt used preferably also includes sodium tetrafluoroborate.

The quantities of the above-described polymer dispersions used in the impregnating bath range from 0.5 to 30% by weight, based on the total solids content of the polymer dispersions, depending on the desired finishing effect. If finishes with a soft fabric hand are to be achieved from 0.5 to 16% by weight, preferably from 1 to 10% by weight, is used, while a finish with a stiff hand is achieved with from 8 to 30% by weight, preferably 10–20% by weight.

Customary impregnating and curing methods for easy-care and crease-resist finishing and the amounts of crosslinker and crosslinking catalysts customarily used are known to the person skilled in the art and therefore need not be more particularly described herein.

The present invention further provides textile auxiliary formulations for the easy-care finishing of textiles containing the above-described aqueous polymer dispersions with a polymer solids content of from 0.5 to 70% by weight.

The copolymerized units of the saccharide component act as a protective colloid for the above-described polymers in the dispersion, thereby producing a very high shear stability on the padding rolls. Finishing liquors which contain these polymer dispersions permit very high production speeds without there being any danger of film formation on the rolls or of spotting on the textile material.

A further application advantage of the film-forming polymer dispersions described is their very good electrolyte compatibility in the textile treatment or finishing bath. They can readily be used together with any cationic auxiliaries.

It is known that the dispersants used for preparing polymer dispersions generally have an adverse effect on the rub fastness properties of dyed and finished textile material. The higher the dispersant concentration in a polymer dispersion, the greater the danger of deterioration in the rub fastness properties. The polymer dispersions described customarily contain only small amounts of co-dispersants. This reduces the danger of deterioration in the rub fastness properties of dyed textile material to a minimum.

Owing to the use of known readily biodegradable saccharides in the preparation of the polymer dispersions described, the textile material treated therewith possesses improved compostability.

A simple admixture of saccharides into the known polymer dispersions without saccharide components or into the impregnating baths does not bring about the application advantages possessed by the polymer dispersions described.

It was also surprisingly found that the novel polymer dispersions, when combined with reactive crosslinkers, distinctly improve the easy-care (non-iron) properties of the finished textile material; they counteract in particular the creasing of the textile material. The creasing of textiles is tested by measuring the crease recovery angles within a predetermined time.

Textile material finished with the polymer dispersions and crosslinkers described gives crease recovery angles which are up to 20% higher than those obtained with the prior art polymer dispersions and the known crosslinkers.

As will be known to those skilled in the art, in the easy-care finishing with reactive crosslinkers, the breaking strength losses of the finished material depend on its degree of crosslinking, which is indirectly measurable from the level of the crease recovery angle; that is, the better the easy-care properties, the higher the crease recovery angle and the greater the breaking strength loss. If the polymer dispersions described are used with crosslinkers of this type no deterioration is observed in the breaking strength despite the distinct improvement in the crease recovery angle.

Moreover, using the above-described polymer dispersions according to the invention on textiles made of cellulose (viscose, cotton, polynosics) reduces the abrasion and wear resistance losses inevitably incurred as a result of the easy-care finishing with reactive crosslinkers.

The incorporated reactive groups make it possible for the polymer dispersions described to react with crosslinkers and thus improve the wash resistance of the impregnation on the material.

In the case of synthetic fiber textiles (polyester, polyacrylonitrile, polyamide) or blends of synthetic fibers with cellulose fibers, they have an antipilling effect.

They can also be added to the impregnating bath as hand modifiers. Depending on the hardness of the film-forming polymer it is possible to obtain fabric hands ranging from soft to very stiff.

The polymer dispersions described can also be used as binders for pigments or pigment dyes in the single-bath dyeing and easy-care finishing of textiles. Preparation of aqueous polymer dispersions The total solids contents were determined in accordance with DIN 53 189.

Dispersion A (for comparison)

Reference (1) was followed to prepare a commercial 45% strength by weight aqueous dispersion of a copolymer of n-butyl acrylate, butanediol diacrylate, N-methylolmethacrylamide and acrylamide that contained no starch.

Dispersion B (for comparison)

Reference (2) was followed to prepare a commercial 50% strength by weight aqueous dispersion of a copolymer of ethyl acrylate, methyl methacrylate, N-methylol methacrylamide and acrylic acid that contained no starch.

Dispersion C

A mixture of 163 g of water and 20 g of the starch Cerestar C*PUR 01915 was heated to 80° C. and admixed with 20% of stream 2 and 10% of stream 1. The mixture was incipiently polymerized at 80° C. for 15 min and then admixed with the remainders of streams 1 and 2 by metered addition. The addition was carried out continuously and took 2.5 h in the case of stream 1 and 3 h in the case of stream 2. The mixture was then further polymerized at 80° C. for 1 h, cooled down and admixed at an internal temperature of <30° C. with 1.1 g of hydrogen peroxide (30% strength by weight in water). 5 min later it was mixed with a mixture of 0.4 g of ascorbic acid, 0.01 g of ammonium iron(II) sulfate and 5 g of water over 15 min and Subsequently stirred for 30 min.

Total solids content of the aqueous polymer dispersion: about 50% by weight.

| Stream 1: | 156 g of water |
|---|---|
| | 392 g of n-butyl acrylate |
| | 8 g of acrylic acid |
| | 0.9 g of a commercial emulsifier based on an alkyl diphenyl oxide sulfonic acid (Dowfax ® 2A1 from Dow) (45% strength by weight in water) |
| Stream 2: | 2.4 g of sodium peroxodisulfate |
| | 98 g of water |

Dispersion D

A mixture of 178 g of water and 40 g of the starch Cerestar C*PUR 01915 was heated to 60° C. and admixed with 20% of stream 2 and 10% of stream 1. The mixture was incipiently polymerized at 80° C. for 15 min and then admixed with the remainders of streams 1 and 2 by metered addition. The addition was carried out continuously and took 2.5 h in the case of stream 1 and 3 h in the case of stream 2. The mixture was then further polymerized at 80° C. for 1 h, cooled down and admixed at an internal temperature of <30° C. with 1.1 g of hydrogen peroxide (30% strength by weight in water). 5 min later it was mixed with a mixture of 0.4 g of ascorbic acid, 0.01 g of ammonium iron(II) sulfate and 8 g of water over 15 min and subsequently stirred for 30 min.

Total solids content of the aqueous polymer dispersion: about 49% by weight.

| Stream 1: | 156 g of water |
| --- | --- |
| | 392 g of n-butyl acrylate |
| | 8 g of acrylic acid |
| | 0.9 g of Dowfax ® 2A1 (45% strength by weight in water) |
| Stream 2: | 2.4 g of sodium peroxodisulfate |
| | 98 g of water |

Dispersion E

A mixture of 203 g of water and 60 g of the starch Cerestar C*PUR 01915 was heated to 80° C. and admixed with 20% of stream 2 and 10% of stream 1. The mixture was incipiently polymerized at 80° C. for 15 min and then admixed with the remainders of streams 1 and 2 by metered addition. The addition was carried out continuously and took 2.5 h in the case of stream 1 and 3 h in the case of stream 2. The mixture was then further polymerized at 80° C. for 1 h, cooled down and admixed at an internal temperature of <30° C. with 1.1 g of hydrogen peroxide (30% strength by weight in water). 5 min later it was mixed with a mixture of 0.4 g of ascorbic acid, 0.01 g of ammonium iron(II) sulfate and 5 g of water over 15 min and subsequently stirred for 30 min.

Total solids content of the aqueous polymer dispersion: about 50% by weight.

| Stream 1: | 156 g of water |
| --- | --- |
| | 392 g of n-butyl acrylate |
| | 8 g of acrylic acid |
| | 0.9 g of Dowfax ® 2A1 (45% strength by weight in water) |
| Stream 2: | 2.4 g of sodium peroxodisulfate |
| | 98 g of water |

Dispersion F

A mixture of 223 g of water and 80 g of the starch Cerestar C*PUR 01915 was heated to 80° C. and admixed with 20% of stream 2 and 10% of stream 1. The mixture was incipiently polymerized at 80° C. for 15 min and then admixed with the remainders of streams 1 and 2 by metered addition. The addition was carried out continuously and took 2.5 h in the case of stream 1 and 3 h in the case of stream 2. The mixture was then further polymerized at 80° C. for 1 h, cooled down and admixed at an internal temperature of <30° C. with 1.1 g of hydrogen peroxide (30% strength by weight in water). 5 min later it was mixed with a mixture of 0.4 g of ascorbic acid, 0.01 g of ammonium iron(II) sulfate and 5 g of water over 15 min and subsequently stirred for 30 min.

Total solids content of the aqueous polymer dispersion: about 50% by weight.

| Stream 1: | 156 g of water |
| --- | --- |
| | 392 g of n-butyl acrylate |
| | 8 g of acrylic acid |
| | 0.9 g of Dowfax ® 2A1 (45% strength by weight in water) |
| Stream 2: | 2.4 g of sodium peroxodisulfate |
| | 98 g of water |

Dispersion G

A mixture of 189 g of water and 40 g of the starch Cerestar C*PUR 01915 was heated to 80° C. and admixed with 20% of stream 2 and 10% of stream 1. The mixture was incipiently polymerized at 80° C. for 15 min and then admixed with the remainders of streams 1 and 2 by metered addition. The addition was carried out continuously and took 2.5 h in the case of stream 1 and 3 h in the case of stream 2. The mixture was then further polymerized at 80° C. for 1 h, cooled down and admixed at an internal temperature of <30° C. with 1.1 g of hydrogen peroxide (30% strength by weight in water). 5 min later it was mixed with a mixture of 0.4 g of ascorbic acid, 0.01 g of ammonium iron(II) sulfate and 5 g of water over 15 min and subsequently stirred for 30 min.

Total solids content of the aqueous polymer dispersion: about 49% by weight.

| Stream 1: | 156 g of water |
| --- | --- |
| | 160 g of n-butyl acrylate |
| | 228 g methyl methacrylate |
| | 12 g of acrylamidoglycolic acid |
| | 1.8 g of Dowfax ® 2A1 (45% strength by weight in water) |
| Stream 2: | 2.4 g of sodium peroxodisulfate |
| | 98 g of water |

USE EXAMPLES 1–16

A cotton fabric with a basis weight of about 110 g/m² was impregnated on a pad-mangle with each of the aqueous finishing liquors specified in Tables 1 and 2, squeezed off to a residual moisture content of about 75% by Weight, dried at 100° C. and cured at 150° C. in the course of 4 min.

The easy-care finish was characterized in the following terms:

—dry crease recovery angle (sum of warp and weft in accordance with DIN 53890)

—breaking strength (weft) measured in accordance with ASTM D 1682-84-175

—Monsanto image after a single 20 minute wash at 60° C.

The shear stability, ie. the resistance to film formation on the padding rolls, was tested using a liquor which is customarily used for finishing. The liquor was admixed with 0.1% by weight of the blue pigment C.I. 74160 to make any deposit on the rolls more visible.

The in-test finishing liquor was first sheared for 10 min with a commercial mixer at about 1000 rpm and then tested for film formation on the padding rolls as follows:

The mixer-treated impregnating bath was introduced into the trough of a pad-mangle. The pad-mangle had two horizontally mounted rolls 9 cm in diameter and 15 cm in length. They were driven electrically via a continuously adjustable drive mechanism. The nip pressure resulted from a lever arm 35 cm in length supporting at its end a lead weight of about 12 kg. The hardness of the rolls was 72° Shore (drive roll) and 84° Shore (pressure roll).

An endless cotton fabric 6 cm in width and 56 cm in length was passed through the finishing bath liquor and upward into the squeeze rolls at about 12 m/min for 30 min.

The film on the rolls—stained by the blue pigment—was rated on a scale from 0 to 5, where 0 denotes a very pronounced film, 3 a medium film and 5 no film.

The results of the tests are shown in Tables 1 and 2.

TABLE 1

Finish with about 45% strength by weight aqueous dimethyloldihydroxyethyleneurea solution as crosslinker and magnesium chloride as crosslinking catalyst

|  | Example |  |  |  |  |  |  |  |
|---|---|---|---|---|---|---|---|---|
|  | 1* | 2* | 3* | 4 | 5 | 6 | 7 | 8* |
| Dimethyloldihydroxyethyleneurea solution | 100 | 100 | 100 | 100 | 100 | 100 | 100 | — |
| MgCl$_2$.6H$_2$O | 12 | 12 | 12 | 12 | 12 | 12 | 12 | — |
| Starch (Cerestar C*PUR 01915) | — | — | 4 | — | — | — | — | — |
| Dispersion A | — | 40 | 36 | — | — | — | — | — |
| Dispersion C | — | — | — | 40 | — | — | — | — |
| Dispersion D | — | — | — | — | 40 | — | — | — |
| Dispersion E | — | — | — | — | — | 40 | — | — |
| Dispersion F | — | — | — | — | — | — | 40 | — |
| Dry crease recovery angle [°] | 191 | 215 | 190 | 215 | 220 | 231 | 244 | 91 |
| Dry crease recovery angle [°] after machine wash [60° C.] | 189 | 210 | 188 | 213 | 218 | 230 | 242 | 95 |
| Breaking strength [N] | 289 | 295 | 285 | 295 | 310 | 305 | 295 | 410 |
| Monsanto image (rating) | 3.6 | 3.8 | 3.8 | 3.8 | 4.0 | 4.0 | 4.2 | 1.0 |
| Roll deposit (rating) | 5.0 | 0 | 0 | 2.5 | 3.0 | 4.0 | 5.0 | — |

The stated amounts are parts by weight; (*) for comparison

TABLE 2

Finish with about 45% strength by weight aqueous dimethyl-4,5-dihydroxyethyleneurea solution as crosslinker and magnesium chloride as crosslinking catalyst

|  | Example |  |  |  |  |  |  |  |
|---|---|---|---|---|---|---|---|---|
|  | 9* | 10* | 11* | 12 | 13 | 14 | 15 | 16* |
| Dimethyl-4,5-dihydroxyethyleneurea solution | 100 | 100 | 100 | 100 | 100 | 100 | 100 | — |
| MgCl$_2$/6H$_2$O | 10 | 10 | 10 | 10 | 10 | 10 | 10 | — |
| Starch (Cerestar C*PUR 01915) | — | — | 4 | — | — | — | — | — |
| Dispersion A | — | 40 | 36 | — | — | — | — | — |
| Dispersion C | — | — | — | 40 | — | — | — | — |
| Dispersion D | — | — | — | — | 40 | — | — | — |
| Dispersion E | — | — | — | — | — | 40 | — | — |
| Dispersion F | — | — | — | — | — | — | 40 | — |
| Dry crease recovery angle [°] | 165 | 195 | 163 | 210 | 221 | 230 | 235 | 91 |
| Dry crease recovery angle [°] after machine wash [60° C.] | 162 | 185 | 162 | 205 | 210 | 222 | 230 | 95 |
| Breaking strength [N] | 340 | 325 | 335 | 320 | 340 | 335 | 335 | 410 |
| Monsanto image (rating) | 2.8 | 3.0 | 2.8 | 3.1 | 3.3 | 3.5 | 3.5 | 1.0 |
| Roll deposit (rating) | 5.0 | 0 | 0 | 2.5 | 3.0 | 4.0 | 5.0 | — |

The stated amounts are parts by weight; (*) for comparison

USE EXAMPLES 17 AND 18

A collar interlining fabric made of pure cotton and having a basis weight of about 150 g/m$^2$ was impregnated on a pad-mangle with the aqueous liquors indicated in Table 3, squeezed off to a residual moisture content of about 85% by weight, dried at 100° C. and cured at 150° C.

TABLE 3

Finish with about 45% strength by weight dimethyloldihydroxyethyleneurea (DMDHEU) solution as crosslinker and magnesium chloride as crosslinking catalyst

|  | Example 17 (invention) | Example 18 (comparison) |
|---|---|---|
| DMDHEU solution | 100 | 100 |
| MgCl$_2$.6H$_2$O | 12 | 12 |
| Dispersion G | 150 | — |
| Dispersion B | — | 150 |

The stated amounts are parts by weight.

The collar interlining fabrics finished according to Examples 17 and 18 both had the stiff and resilient fabric hand required of collar interlinings. However, the two impregnating liquors used differed in the running properties, ie. in the tendency to leave a deposit on the pad-mangle rolls. The finishing liquor containing dispersion B left a very pronounced deposit, while the liquor containing dispersion G left none at all.

We claim:

1. A method for the easy-care finishing of textiles, which comprises impregnating the textile material with an aqueous bath which contains (A) at least one aqueous polymer dispersion obtained by free-radical aqueous emulsion polymerization of a free-radically polymerizable unsaturated monomer or mixture of monomers in aqueous phase in the presence of a saccharide or of a mixture of saccharides, (B) a reactive crosslinker with N-alkyl, N-methylol or N-methylol ether groups, and (C) a crosslinking catalyst, and drying the impregnated textile material at from 80° C. to 200° C., wherein the polymerizable unsaturated monomers consist essentially of, based on the unsaturated monomers, of (a) from 90 to 99% by weight acrylic acid, methacrylic acid or a mixture thereof esterified with alkanols of from 1 to 8 carbon atoms, and from 1 to 10% by weight of acrylic acid, methacrylic acid or a mixture thereof, or (b) from 90 to 99% by weight of at least one ester of an α,β-monoethylenically unsaturated mono- or dicarboxylic acid of from 3 to 6 carbon atoms with an alkanol of from 1 to 6 carbon atoms, from 1 to 10% by weight of at least one monomer selected from the group consisting of α,β-monoethylenically unsaturated carboxylic acids of from 3 to 6 carbon atoms, their amides and nitriles, and from 0 to 10% by weight of one or more monomers selected from the group consisting of N-alkylolamides of α,β-monoethylenically unsaturated carboxylic acids of from 3 to 6 carbon atoms having from 1 to 4 carbon atoms in the alkyl group and monomers of up to 25 carbon atoms containing two conjugated ethylenically unsaturated double bonds.

2. The method according to claim 1, wherein the saccharide is a monosaccharide, oligosaccharide or polysaccharide, oxidatively, hydrolytically or enzymatically degraded or modified, or mixtures thereof.

3. The method according to claim 1, wherein the polymer is obtained by polymerizing 100 parts by weight of the unsaturated monomer or mixture of monomers in an aqueous phase in the presence of from 1 to 50 parts by weight based on the unsaturated monomer or mixture of monomers of the saccharide component.

4. The method according to claim 1, wherein the polymerizable unsaturated monomers consist essentially of, based on the unsaturated monomers, of from 90 to 99% by weight acrylic acid, methacrylic acid or a mixture thereof esterified with alkanols of from 1 to 8 carbon atoms, and from 1 to 10% by weight of acrylic acid, methacrylic acid or a mixture thereof.

5. The method according to claim 4, wherein the polymerizable unsaturated monomers consist essentially of, based on the unsaturated monomers, of 90–99% by weight of n-butyl acrylate and 1–10% by weight of acrylic acid, methacrylic acid or a mixture thereof.

6. The method according to claim 1, wherein the polymerizable unsaturated monomers consist essentially of, based on the unsaturated monomers, of from 90 to 99% by weight of at least one ester of an monoethylenically unsaturated mono- or dicarboxylic acid of from 3 to 6 carbon atoms with an alkanol of from 1 to 6 carbon atoms, from 1 to 10% by weight of at least one monomer selected from the group consisting of α,β-monoethylenically unsaturated carboxylic acids of from 3 to 6 carbon atoms, their amides and nitriles, and from 0 to 10% by weight of one or more monomers selected from the group consisting of N-alkylolamides of α,β-monoethylenically unsaturated carboxylic acids of from 3 to 6 carbon atoms having from 1 to 4 carbon atoms in the alkyl group and monomers of up to 25 carbon atoms containing two conjugated ethylenically unsaturated double bonds.

7. A textile auxiliary formulation for easy-care finishing of textiles comprising aqueous baths according to any one of claims 2, 3 and 4 to 1 having a polymer solids content of from 0.5 to 70% by weight.

* * * * *